US006862528B2

(12) United States Patent
Scannell

(10) Patent No.: US 6,862,528 B2
(45) Date of Patent: Mar. 1, 2005

(54) MONITORING SYSTEM AND PROCESS FOR STRUCTURAL INSTABILITIES DUE TO ENVIRONMENTAL PROCESSES

(75) Inventor: Joseph P. Scannell, West Hartford, CT (US)

(73) Assignee: USEngineering Solutions Corporation, Hartford, CT (US)

(*) Notice: Subject to any disclaimer, the term of this patent is extended or adjusted under 35 U.S.C. 154(b) by 0 days.

(21) Appl. No.: 09/844,968

(22) Filed: Apr. 27, 2001

(65) Prior Publication Data

US 2002/0055820 A1 May 9, 2002

Related U.S. Application Data

(63) Continuation of application No. 09/905,724, filed on Apr. 27, 2000.
(60) Provisional application No. 60/200,114, filed on Apr. 27, 2000, and provisional application No. 60/131,127, filed on Apr. 27, 1999.

(51) Int. Cl.[7] ........................... G01F 19/00; G01W 1/00
(52) U.S. Cl. .......................................... 702/3; 340/601
(58) Field of Search ............................. 702/2, 3, 4, 5; 340/601, 2.24; 703/5

(56) References Cited

U.S. PATENT DOCUMENTS

| 4,498,808 A | 2/1985 | Manikian et al. ............. 405/61 |
| 4,832,528 A | 5/1989 | Lisart .......................... 405/116 |
| 5,349,327 A | 9/1994 | Waters ....................... 340/540 |

(List continued on next page.)

OTHER PUBLICATIONS

"Bridge–Scour Data Management System User's Manual", Landers et al., US Geological Survey, Open–File report 95–754, Virginia 1996.*

"Local Scour around Bridge Piers", Shen et al., Journal of the Hydraulics Division, vol. 95, No. HY6, 1969, Papers 1919–1940.*

"Scour at Bridges–Detailed Data Collection During Floods", Mueller, Proceedings of the Federal InterAgency Sedimentation Conference, 1996, vol. 1.*

"Bridges Scour Evaluation: Screening, Analysis, and Countermeasures", Kattell et al., USDA Forest Service, Sep. 1998.*

U.S. Department of Transportation Federal Highway Administration, The Use of Internet Based Software as a State's Scour Monitoring/Action Plan, date unknown.

Carlton L. Ho, et al; Real–Time Bridge Scour Assessment and Warning; *The New England Transportation Consortium* (NETCR 24); Mar. 30, 2001.

Carlton L. Ho, et al; Development of Priority Based Statewide Scour Monitoring Systems in New England; *The New England Transportation Consortium* (NETCR 24); Aug. 2, 2001.

"AASHTO Glossary of Highway–Related Drainage Terms," Highway Drainage Guidelines [Metric Edition], prepared by the Task Force on Hydrology and Hydraulics AASHTO Highway Subcommittee on Design, American Association of State Highway and Transportation Officials, 1999, pp. 2, 9, 43.

*Primary Examiner*—John Barlow
*Assistant Examiner*—Toan M. Le
(74) *Attorney, Agent, or Firm*—Kevin A. Oliver; Foley Hoag LLP

(57) ABSTRACT

An instrumented structure is combined with real time environmental and weather information. The data from the structure is monitored via the Internet or another communications system. That information together with historical, analytical and the other relevant data in environmental events influencing the infrastructure are used to determine thresholds. When a threshold is passed the system automatically notifies a user who can then remotely access the real time events and measurements. The user can have real time relevant information to react to any emergency.

39 Claims, 11 Drawing Sheets

U.S. PATENT DOCUMENTS

| | | | | |
|---|---|---|---|---|
| 5,532,687 A | * | 7/1996 | Richardson et al. | 340/870.33 |
| 5,720,576 A | | 2/1998 | Scuero | 405/116 |
| 5,815,417 A | * | 9/1998 | Orr et al. | 703/5 |
| 5,835,386 A | * | 11/1998 | Orr et al. | 703/2 |
| 6,012,337 A | * | 1/2000 | Hodge | 73/803 |
| 6,055,480 A | * | 4/2000 | Nevo et al. | 702/3 |
| 6,181,841 B1 | * | 1/2001 | Hodge | 385/12 |
| 6,487,914 B1 | * | 12/2002 | Hodge | 73/800 |
| 6,647,161 B1 | * | 11/2003 | Hodge | 385/12 |

* cited by examiner

TOP VIEW

SIDE VIEW

— HORSESHOE VORTEX
--- WAKE VORTEX

MONITORING SYSTEM AND PROCESS FOR STRUCTURAL INSTABILITIES DUE TO ENVIRONMENTAL PROCESSES

CROSS-REFERENCE TO RELATED APPLICATIONS

This application claims priority as a continuation-in-part to U.S. Ser. No. 09/905,724, which is a converted non-provisional application of U.S. Provisional Application Ser. No. 60/200,114, entitled "Bridge Scour Monitoring System and Process" filed Apr. 27, 2000, which application claims priority of U.S. Provisional Application Ser. No. 60/131,127, entitled "Bridge Scour Monitoring Software" filed Apr. 27, 1999. The above priority applications are hereby incorporated herein by reference in their entireties as are all of the references, including but not limited to any books, articles, reports, photos or published patent applications, cited throughout this application.

FIELD OF THE INVENTION

The present invention relates generally to bridge and other hydrological structure safety and, more particularly, to the collection, provision, and dissemination of data regarding specific bridges and other related structures via a computer system and real-time display. The methodology, system, and display of the invention allow users to make rapid and informed decisions about scour-critical bridges and other structures to ensure public and environmental safety.

BACKGROUND OF THE INVENTION

Bridges and other related hydrological structures have been known to fail unexpectedly. These structural failures result in inconvenience to travelers, expense to the public, destruction of property, and in the worst cases, even casualties. It would be beneficial to anticipate and forestall structural failures.

One particular cause of the failure of a hydrological structure is called a "scour." Scour occurs when hydrologic features, such as rivers, causeways, or lakes, are interrupted by bridge sub-structure elements. The process of scour may occur at any time but is exacerbated by flooding events and severe tidal surges.

Conventionally, scour has three forms: local scour, contraction scour, and degradation scour. An example of local scour is the removal of sediment from around bridge piers or abutments. Interruption in the conveyance of water by a pier or abutment creates vortices at and around the interfaces of these structure elements (see FIG. 1.) These vortices create a turbulent state that results in the removal of sediment such that holes are formed adjacent to the pier or abutment: hereafter referred to as "scour holes." Contraction scour is the removal of sediment from the bottom and sides of a hydrologic channel. Contraction scour is caused by the increased velocity of water as the water moves through a bridge opening that is narrower than the natural hydrologic channel. Degradation scour is the gradual removal of sediment from the channel bottom by the flow of the hydrologic feature. The sediment removal and resultant lowering of the channel bottom is a natural process, and, over time, large amounts of sediment may be removed. The erosion of soil supporting a structure eventually leads to structural instability and ultimately failure if not corrected.

Thousands of structures span hydrologic features around the world, including in the United States. Even at the community level, it is difficult to maintain a diligent watch on all of these structures and inspections involving a person can be dangerous, especially during flooding events. A number of scour monitoring devices are described in Instrumentation for Measuring Scour at Bridge, Piers and Abutments. Transportation Research Board, 1997, NCHRP National Cooperative Highway Research Program, Report No. 396, ISSN 0077-5614, ISBN 0-309-06069-9, LC Cat Card No. 97-61382. However, scour problems can occur very suddenly and without warning even with regular inspections and monitoring.

It is an object of the present invention, through the use of information technology, predict scour risk through constant data collection is needed in order to ensure safety for the public and the environments being protected by these structures and to efficiently gather, evaluate, and present data in a coordinated manner to allow users to more effectively evaluate, prioritize, and determine the appropriate actions required to maintain public safety and preserve of public and private property.

SUMMARY OF THE INVENTION

A combination software system and methodology can be employed by a person to effectively and safely manage bridges and other hydrologic structures. This combination requires upgrading the nature, quantity, and quality of the relevant data collected from bridges or related structures. Real-time data can be rapidly collected, processed, and logically presented with the prior and historical data, so that a response may be orchestrated in a timely and cost-effective manner. Corrective measures may include physical inspection, closing of bridges to traffic, and/or repair or replacement of the structures in question.

Data collection, presentation, and timely user notification of problems are particularly important for successful monitoring of scour critical structures and other structures whose performance can be affected by meteorological and hydrological conditions.

The above objects are addressed by a system and method with the means of extracting and processing real-time data from bridges and related structures and the local environment. The data are collected and relayed via a communications network to a central site. The historical and analytical information concerning the structures are stored in a database and presented at the central site in a coordinated manner with the real-time data. Thresholds are established in any relevant parameter and when any such threshold is reached, the system presents a prioritized notice at the central site and notifies appropriate users of the system via relevant communication hardware such as, phones, cell phones, facsimiles, pagers, PDAs (personal digital assistants) and instant messaging. The central site or database can provide a visual interface that allows a user to view the location, surrounding hydrologic features and any other structures within the local population density. The location view can include maps of the area that are interactive with users so that the order and detail of the maps can be altered by the user.

The system is connected to a communications network that may be the Internet, a local network with a portal to the Internet, or groups of networks and redundant computer systems and/or networks. The system of the present invention can include interactive pages and software code that routinely interrogates data repositories, databases, Web sites, and other electronic media for collection of relevant data. Such interrogation may be programmed to run on a time or event basis, or some other such criterion as is known in the art and defined by a user, a system administrator or a default preference.

DETAILED DESCRIPTION OF PREFERRED EMBODIMENTS

The above objects are addressed by a system and method with the means for the collection, compilation, presentation, and communication of structural and other environmental data. Environmental data includes, but is not limited to, meteorological data, hydrological data, and geological data.

Figure 1A:
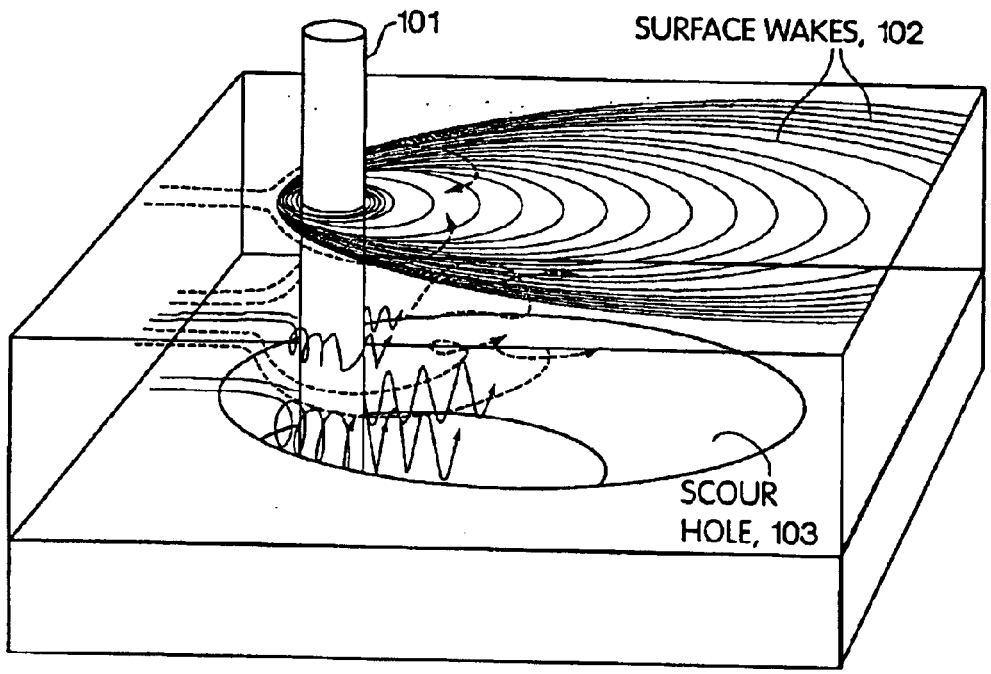
FIG. 1A–1C depict one method of scour at a cylindrical pier.

FIG. 1A shows scour 103 around a cylinder 101 from a prospective view with surface wake 102, caused by turbulence.

Figure 1B:
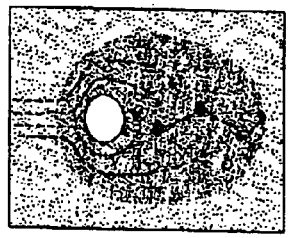

FIG. 1B shows a top view with a wake vortex.

Figure 1C:
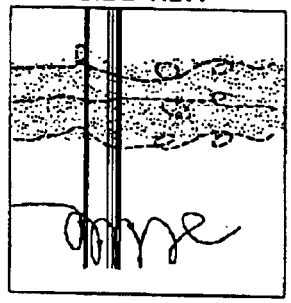

FIG. 1C shows a side view with a wake and horseshoe vortex.

Figure 2:
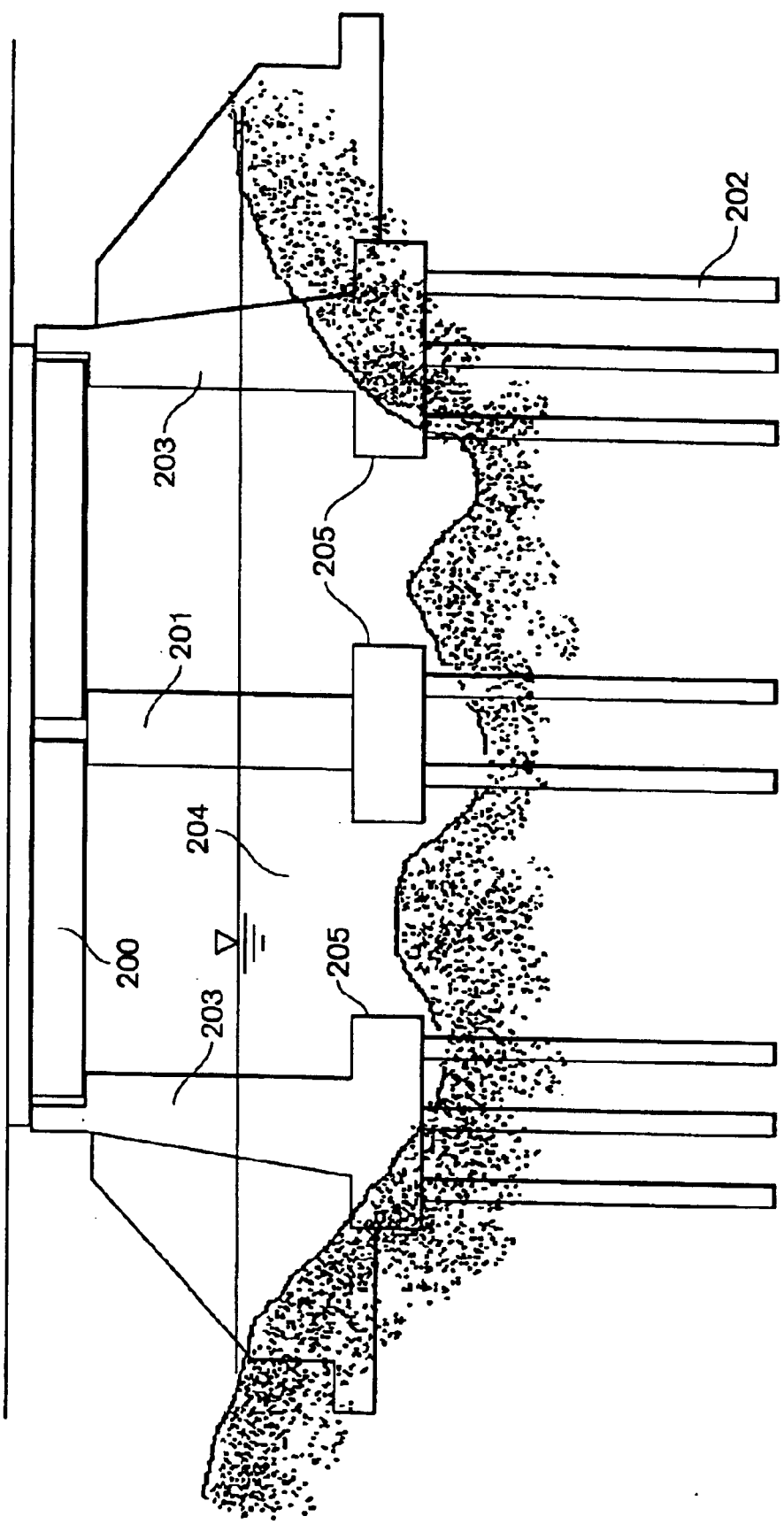
FIG. 2 is an elevation drawing of a bridge spanning a hydrologic feature.

FIG. 2 is an elevation drawing of a structure, in this case a two-span bridge, spanning a hydrologic feature. The bridge 200 has one pier 201 in the center and two abutments, 202 supported by friction piles 203. Water 204 flows under the bridge opening creating scour holes 205 in front of and around the pier 201 and abutments 202.

Figure 3:
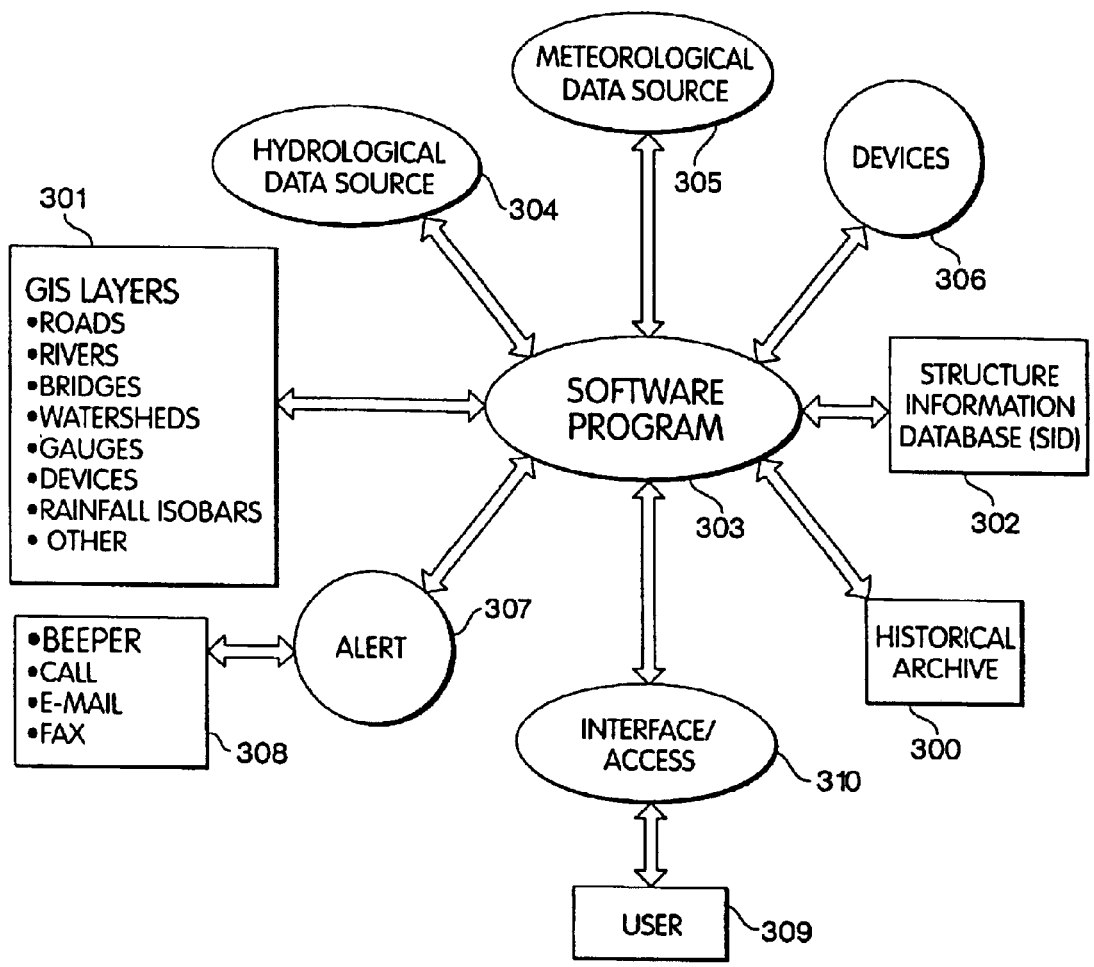
FIG. 3 is a diagram of an embodiment of the system.

FIG. 3 is a diagram of an embodiment of the inventive system and representative of a central system computer, distributed computer system, or the like where the database resides. There are means for connecting to communications networks locally and remotely, such as through the Internet. Such means include a wired or wireless data communication between components of the member. See Computer Networks 2d Ed., by Andrew S. Tannenbaum, Practice Hall (1996) for a description of Network communications that may be employed in the present invention. The system may interact with other systems and servers to send and receive data, such as relevant governmental (state and federal) agencies and third party weather information services.

In FIG. 3, "Historical Archive" 300 represents the database of information related to structure event performance data. Included in this information is the historical data for each structure including prior events and the time frame of these events. "GIS" 301 represents a Geographical Information System; this is data of any and all types that is put into a visual form. One or more types of data can be displayed to provide the user with the benefit of visual interpretation of data and relationships between various data sets. For example, the user may want to create a map to depict the relationship of rivers, roads, bridges, dams and river gauges to review the coverage of a gauge network.

Figure 8:
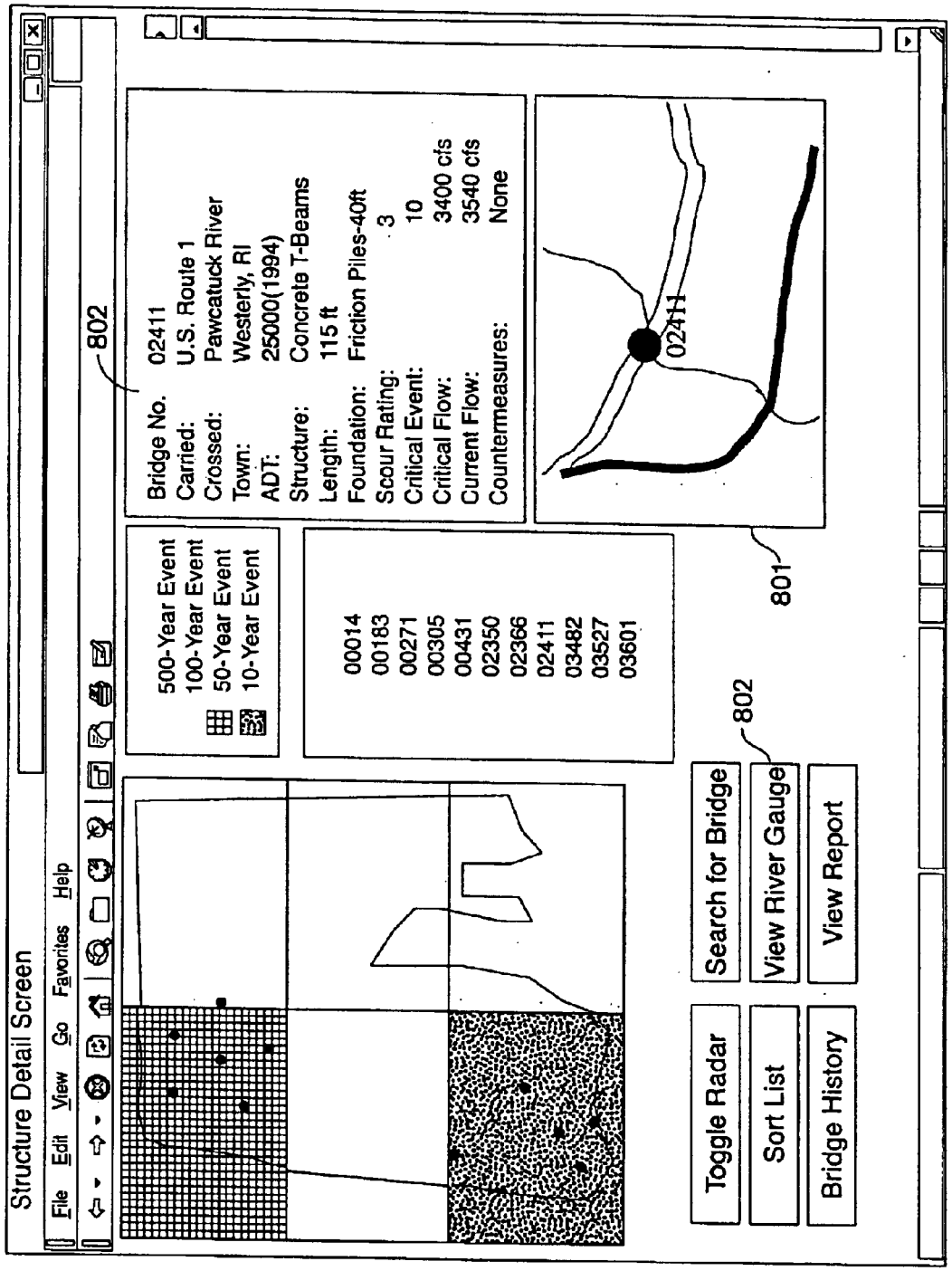
Figure 10:
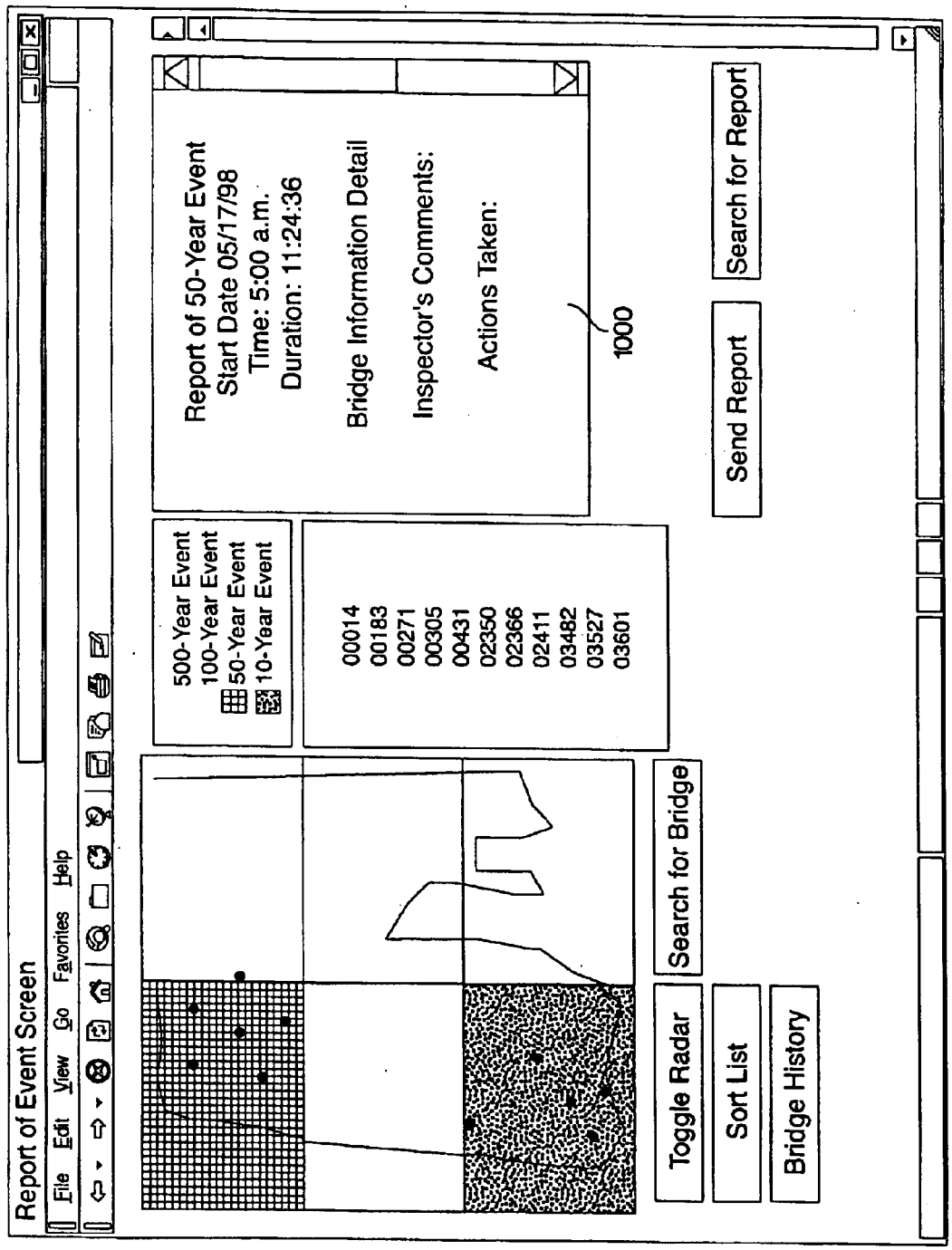

The "Structure Information Database (SID)" 302 contains the structural-related data: possibly including, but not limited to or required to have, structural detail, attributes, plans, inspection reports, maintenance memos, and bridge history. Also see FIGS. 8 and 10 showing the "Structure Detail" and "Report of Event". The historical data may contain original specifications of a structure itself, inspection reports, as well as the occurrence and type of events involving the structure. Thresholds are determined by studying factors including but not limited to, known parameters of the structure, current and expected environmental conditions, human populations and possible damage costs. These thresholds are established, in an embodiment, for virtually any condition requiring intervention. In a preferred embodiment, the method of user notification as well as the method for determining which user or users require notification can be established based upon the type and extent of threshold being exceeded and the threshold prioritization.

Referring to FIG. 3, relevant data is routinely collected via features in the software program 303, which can be accomplished using an automated software program called a "bot" or "Web-robot," and the data is stored into the appropriate database for retrieval. This data can include hydrological 304 and meteorological 305, and may be, data from sites such as, The National Oceanic and Atmospheric Administration (NOAA), the National Weather Service (NWS), the U.S. Geological Survey (USGS), radar sources, as well as data from physical sensors and other such monitoring devices. Such devices 306 may include river gauges that measure depth and flow rates, sliding collars, and other such devices that may directly measure structural parameters on a structure, like strain gauges, deflection meters, current traffic, and even relevant parameters regarding the local environs or device parameters like battery level or a malfunction or calibration indicator. Such devices may be battery powered or directly connected to power sources so that real-time data may be remotely monitored via a communication network such as the Internet. Other data may be collected from such devices by hand or by human measurements and input into the system. The above and other data may be used to identify conditions that may result in severe flooding or other water-related catastrophic events.

The software program, 303 of FIG. 3, can run the entirety of the system and may include known software, including operating systems and languages. This software, may be distributed and operate via known communications channels. For example, Windows NT, Windows 98, Mac, Unix, Linax, BSD and many other such operating systems are known in the art. Java, HTML, PERL, C++ and other such languages may be used with the appropriate compilers, assemblers, and servers. Mapping data is presented using a Geographical Information System (GIS) 301 software such as ArcInfo, ArcView, Geomedia, or any other GIS software product. Such known programs and languages may be used in building a system of the invention. In a like manner, the system hardware can include computers, communications, local networks, modems and memory and may be assembled and built from known sources including suppliers such as IBM, Dell, Apple, Hewlett-Packard, EMC and Compaq.

The operation of the system, in an embodiment, will analyze the data from at least one source and observations utilizing algorithms and comparing the results against thresholds, that when exceeded can cause an alert 307 to be output to a user and/or to another systems. Such thresholds may be arranged into priority levels and alarms. For example, numerical thresholds for scour, flooding or some other such criterion are resident in the system and implemented as determined by the user or a system administrator. In certain embodiments, non-numerical codes may be used. Referring to FIG. 3, the software 303 outputs automatic alerts 307 to users 309 when thresholds are exceeded. Such alerts may be transmitted via 308 telephone, cell phone, pager, e-mail, instant messaging PDA (personal digital assistant) or equivalent means to inform those knowledgeable people capable of technically evaluating and responding to critical issues needing immediate attention. The user 309 can log onto the system to remotely review the information and data via an application interface 310. In a preferred embodiment, the data is presented as shown in FIGS. 7–11. The user is preferably a person that has the background, training and understanding to respond to the wide variety of circumstances that may occur. A security measure such as a password, call back verification, biomatrix authentication, or voice or finger print identification can be included in the system to allow only permitted users to enter the system and review the data. Likewise, data can be encrypted during transmission such as with a virtual private network to prevent unauthorized interception of the data.

In one embodiment, the inventive system provides the Department of Transportation (DOT) engineers the ability to monitor a bridge population for potential scour events with real-time hydrologic and meteorological information. In a preferred embodiment and as described above, the system uses a web browser capable of encoding and decoding encrypted data from Active Server Pages (ASP's) and software programs that allow interrogation by the system. The Internet is a preferred communications network because it is widely available on a number of platforms, and the system can be organized by and for a governmental agency responsible for monitoring hydrological structure integrity. The system can run on local server which may be operated redundantly to decrease the likelihood of information being available. One central server may be enabled to access other individual servers in other locations including those with security systems in place.

In another embodiment, the system can be used to prioritize risk factors and to calculate probabilities of failure to create a prioritized watch list of structures. For example, this would allow a user to increase the effectiveness of emerging presume and repair response to better use limited resources.

The system can collect and evaluate data and relevant information from the various sources listed above and, along with the monitored real-time data from the Web-robots, identify flooding or other weather related catastrophic possibilities. Such possibilities can be automatically reported to the proper user or users.

The inventive system can also provide a list of scour critical structures that may be affected by a critical event. The system could alert a user via a communication means such as a cellular phone, pager, fax, e-mail or instant messaging that the user should monitor the critical event. In some instances, structural safety inspectors or other relevant personnel (such as emergency response, police or fire fighters) can be notified when catastrophic events require closing of structures or other such extreme actions. As described above real-time and historical data, structure construction information and structure experience data can be made available to the monitoring personnel through in interface.

Databases can be separate, however, in alternate embodiments of the invention, the data could be stored in a single database or in other configurations and combinations of databases. A database preferably resides in a secure computer system that is routinely monitored, optimized, and backed-up to ensure data safety quality and preservation. In a preferred embodiment a database server provides data to a web browser via encryption. The encryption may be of the public/private key type, private key only type, or other such encryption means and key bit widths that are known in the art. The system is connected to a communications network that may be the Internet or a local network with a portal to the Internet, groups of networks and redundant computer systems and/or networks, or a dial-up network via telephone lines, as known in the art.

Figure 4:
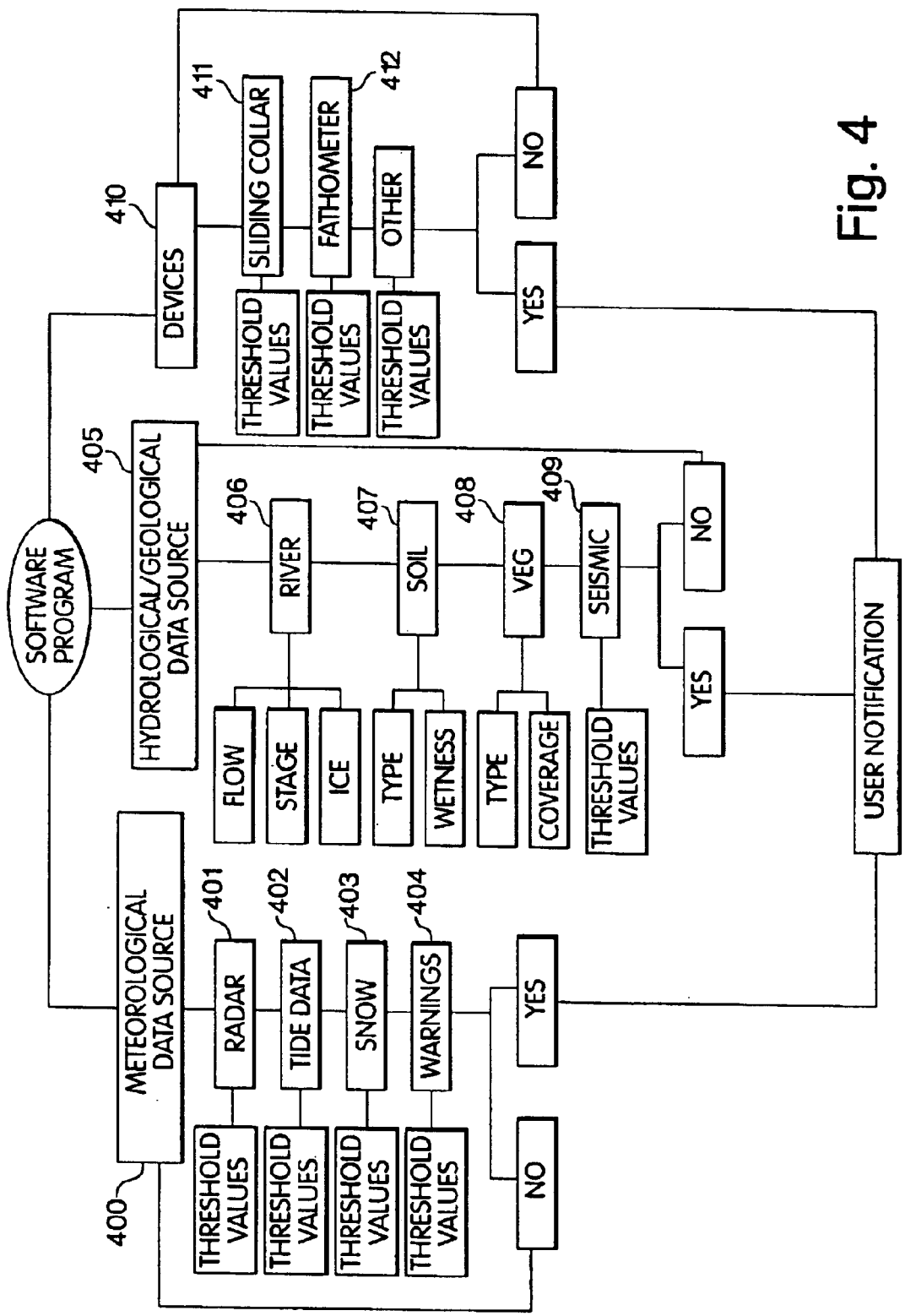
FIG. 4 is a block diagram of the data collection of an embodiment a the system of the invention.

FIG. 4 is a block diagram of an embodiment of a data collection methodology of the invention. Data can be collected from a plurality of sources and can be stored in a central database to ensure continuing availability even if the source data charges. The central database can be an object oriented database management system. Suitable databases include a structured query language compatible database, an Access database, an Oracle database, a mainframe database, a tab delimited database, a Comma-Separated Value database or an Excel database. Threshold values can be defined by the user and could vary according to each user's preferences guidelines and processes. Threshold values for the meteorological data 400 might be as follows:

Radar 401—Decibels of reflectivity indicative of storm intensity or predicted inches of rainfall over a measured period of time like 24 hours. (See Table 1)

TABLE 1

Rain Rate in decibels and inches per hour

| dBZ | Rainrate (in/hr) |
| --- | --- |
| 65 | 16+ |
| 60 | 8.00 |
| 55 | 4.00 |
| 52 | 2.50 |
| 47 | 1.25 |
| 41 | 0.50 |
| 36 | 0.25 |
| 30 | 0.10 |
| 20 | Trace |

Tide data 402—A particular tidal stage measured in feet above sea level, e.g.; 5.0 ft.

Snow 403—Depth of snow cover measured as an average over a particular watershed.

Warnings 404—The National Weather Service (NWS) utilizes codes to indicate specific types of warnings. Notification may need to be sent when a user specific warning is of concern, for example:

"FLWALB

NYZ042-170300

FLOOD WARNING

NATIONAL WEATHER SERVICE ALBANY N.Y.

815 AM EDT MON Apr. 16, 2001"

The above is an actual heading for a Flood Warning issued by the NWS office in Albany, N.Y. These warning types could, themselves, be reason for notification and considered a threshold for system activity.

Threshold values for the hydrological or geological data 405 might be as follows:

River 406—River Flow measured in cubic feet per second (cfs), River Stage measured in elevation, and Ice determined by whether or not it exists Soil Parameters 407—Soil types/soil wetness indices Vegetation 408—Vegetation type and density of population Seismic 409—These threshold values (would be in a measurement of the Richter scale). (See Table 2).

TABLE 2

Seismic measurements severity scales

|  | Mercalli | Richter |
| --- | --- | --- |
| Mild | I–III | 0–4.3 |
| Moderate | IV–V | 4.3–4.8 |
| Intermediate | VI–VII | 4.8–6.2 |
| Severe | VIII–X | 6.2–7.3 |
| Catastrophic | XI–XII | 7.3–8.9 |

The Device 410 (direct scour measuring type) threshold values will be determined by comparing the elevation of the bottom of foundation with the elevation of the structure being monitored. This value could be one or two feet (or other distance units) above the bottom of structure footing as measured in an elevation datum. In other embodiments the value is in the range of 0.25 feet to 10 feet or more. There are over a dozen direct scour measuring devices that are employed to monitor structures. Most common are the magnetic sliding collar 411 and the sonic fathometer 412(see FIG. 6, element 602.). These devices are employed to determine scour activity when connected to a system of telemetry. A sliding collar is a stainless collar with large magnets attached. The collar is clasped loosely around a pipe driven in front of a substructure element. Inside the pipe are small switches that are activated by the magnets on the collar as the collar slides downward during the progression of scour at the substructure element being monitored. The sonic fathometer, 412 and 602 is simply a transducer 602 mounted on a structure 601 that sends sonic impulses 602 around a substructure element and records depth readings. These devices can measure a scour hole 605 as it is created.

Figure 5:
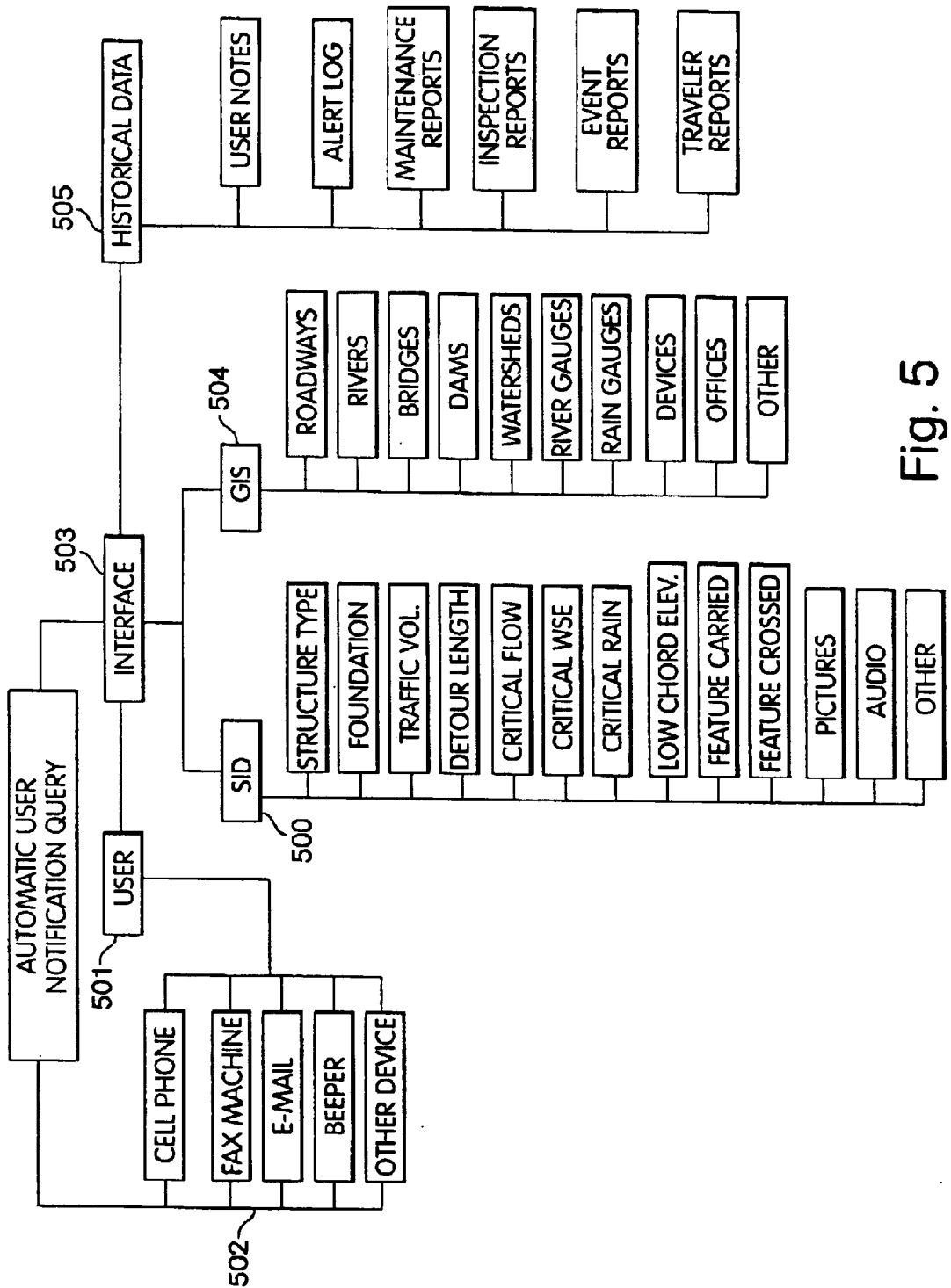
FIG. 5 is a block diagram of data notification and presentation in an embodiment of the invention.

FIG. 5 is a block diagram of the user notification and presentation portion of the system according to principles of the invention. The following are definitions for the Structure Information Database (SID) 500 portion of the system:

Structure Type—The facility that supports traffic over or from hydrologic features. Examples include, but not limited to, bridges, dams, levees and culverts.

Foundation—The supporting element of a structure, including but not limited to a footing, pilings, gabions, soil.

Traffic Volume—This is typically measured in vehicles per day or Average Daily Traffic (ADT).

Detour Length—The next best route of travel if a structure needs to be closed to traffic. This would be measured in units of distance, e.g., miles or kilometers.

Critical Flow—This is the volume of water passing under a structure that is critical for the crossing structure. This can be measured in cubic feet per second.

Critical WSE—This is the Water Surface Elevation, which can be measured in feet, that is important for the structure being monitored.

Critical Rain—The intensity of rainfall measured in inches or another unit over a 24-hour period.

Low Chord Elevation—The elevation, measured in feet, of the lowest structural element spanning a hydrological feature.

Feature Carried—Example features include, but not limited to, a highway, railway, pedestrian walkway, building, or wharf.

Feature Crossed—The hydrological feature the structure crosses, including but not limited to a river, stream, lake, canal or causeway.

Pictures or Audio—Digital images, still or video and with or without audio, or audio alone of the structure and local environment.

Figure 7:
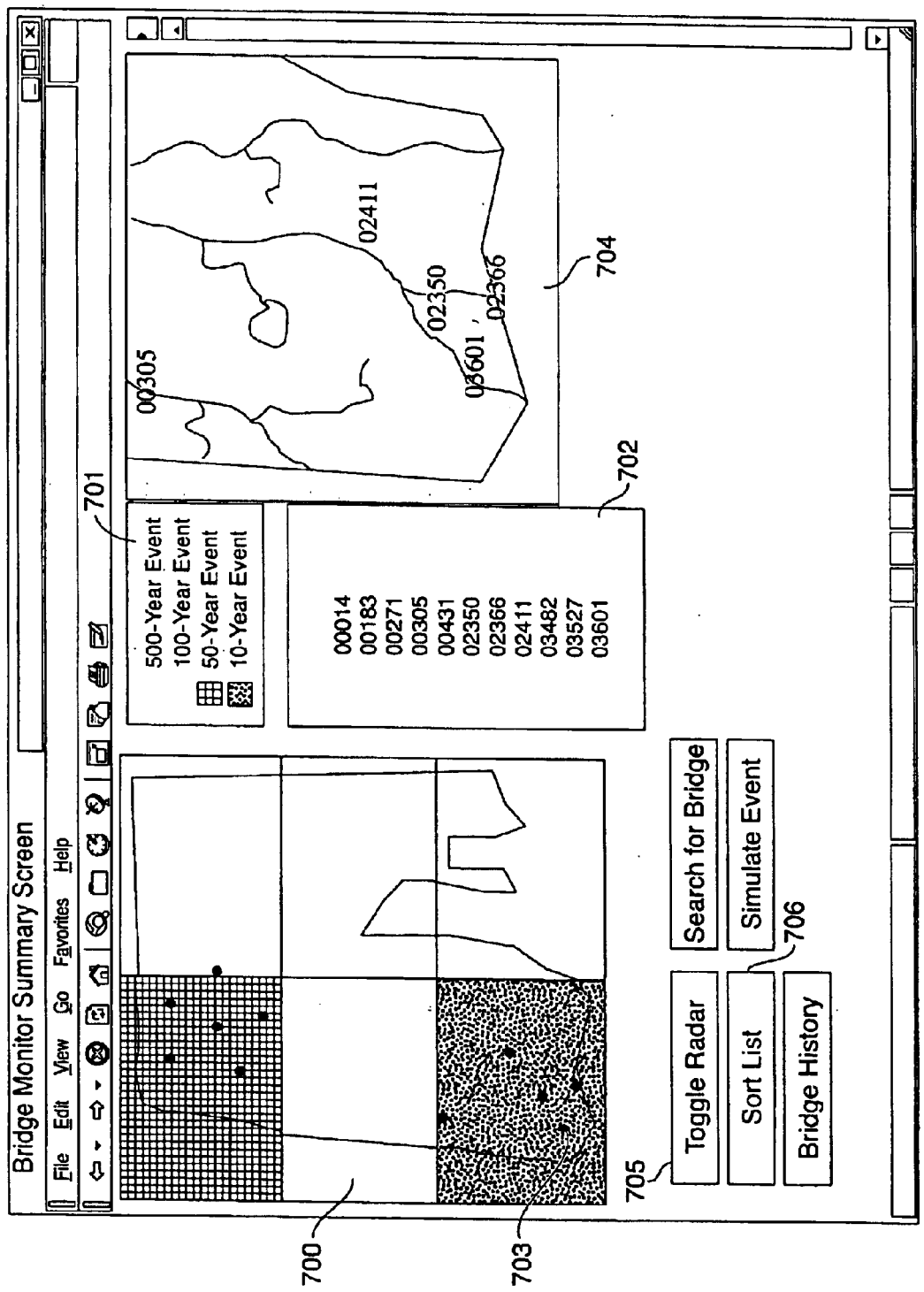
FIGS. 7–10 are embodiments of a data interface of the invention providing map presentation screens indicating that a threshold is triggered for a bridge structure with additional screens providing more detailed information, maps, and historical information.

In a preferred embodiment, a user 501 may be notified by pager, cell phone, or facsimile of a scour-critical event and subsequently log on to the Internet and the inventive system interface 503 using the proper security passwords and any other such codes. The user can receive a detailed visual notice of the event and the threshold being exceeded. The user will be presented with a map of the area, for example, of Rhode Island (R.I.) as shown in FIG. 7. The left map of R.I. is divided into six quadrants as shown in FIGS. 7–10. These divisions are determined by watershed boundaries or weather zones an embodiment of the invention.

Figure 6:
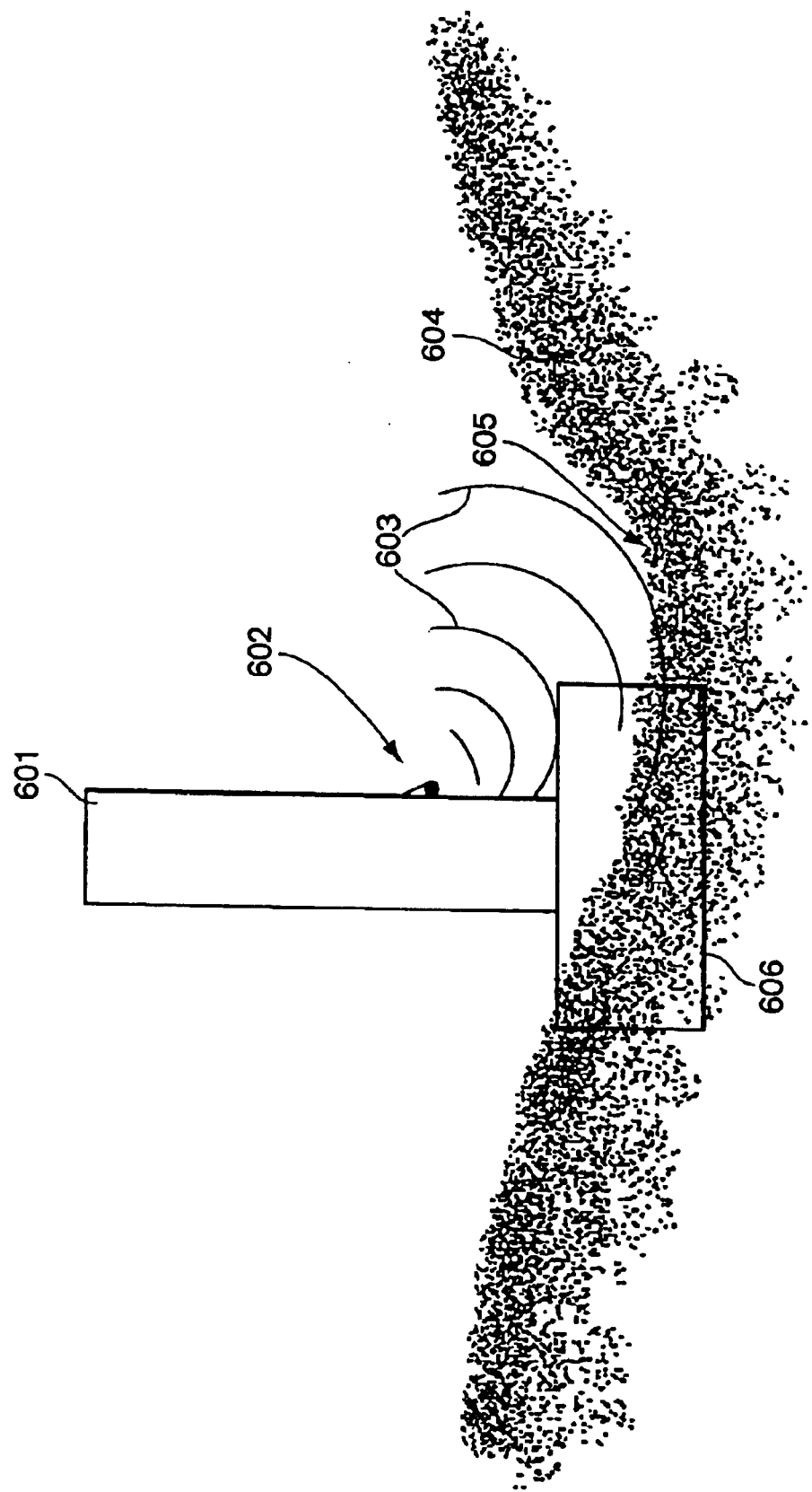
FIG. 6 is a schematic depiction of a Sonic Fathometer scour-mearuring device.

FIG. 6 shows an embodiment of a scour meter, in particular a sonic fathometer 602, mounted on a pier substructure element 601. Sonic waves 603 reflect off the channel bottom 604 to indicate to the fathometer the size and depth of the scour hole 605. Such depth can be used to indicate the potential of exposing the bottom of the footing 606 to the scour hole 605.

Referring to FIGS. 7–10, appearing in the top middle of the display is an event legend 701 that shows events that typically occur every 10, 50, 100, or 500 years onto the map. A watch list 702 can be created from the structural information database of bridges located in the quadrants. Scour Critical bridges can be displayed as dots 703. The user can focus on a manageable group of structures as shown 704. The scour-critical structures in this quadrant can be marked by Bridge Numbers or structure numbers. The user can see the current precipitation via radar 705 in the affected area with the mouse/cursor. In this preferred embodiment, an overlay presents the precipitation data.

The user can view the meteorological information and the affected structures sorted against the watch list. The user can sort the list 706 by structure type, structure function (including railroad or roadway) and determine which structures are most critical. In this embodiment these operations can be selected by pointing and clicking with the mouse at a terminal or by another input device inducing a touch screen, a keyboard, a track pad or stick controller. By selecting on the bridge number or location on a map the user is provided with the structure specific information (see FIG. 8), with data concerning the structure 800(possibly including, but not limited to, structure type, length, breadth, function, year built, number and type of gauges attached, prior events, structure plans, digital images (still or video) including a map 801. The structure can be identified and alternate routes can be highlighted. A "View Gauge" button 802 can be provided for viewing actual gauge data (see FIG. 9).

Figure 9:
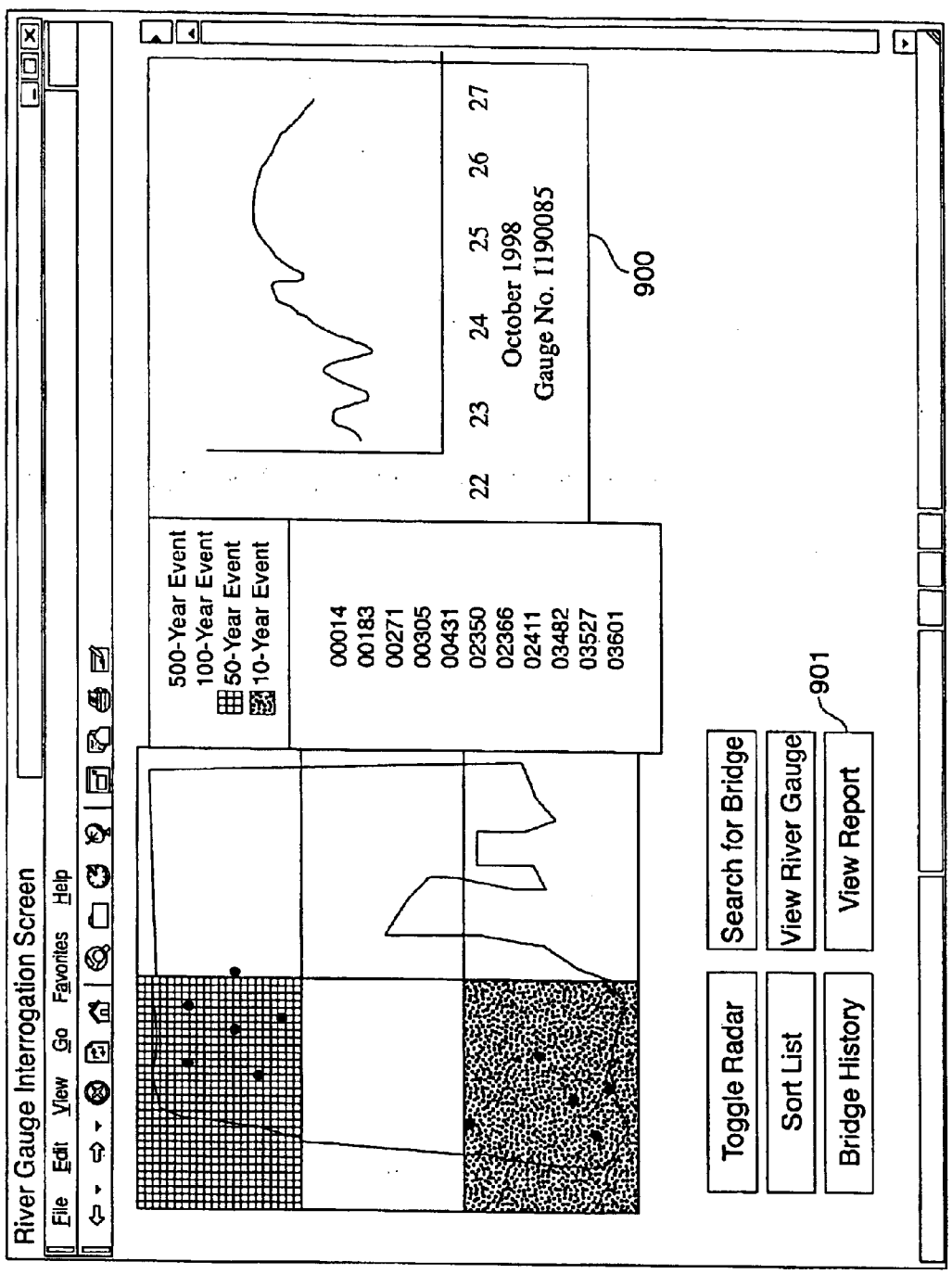

FIG. 9 is a graphical image of an actual river gauge 900 with real-time reporting. The user is provided a "View Report" button 901 for viewing a report of the event or past events (see FIG. 10).

Referring to FIGS. 7–10 a "Toggle Radar" function allows the user to obtain the radar weather. A "Search for Bridge" function allows the user to select a bridge and find its location on the map. A "Sort List" function allows the user, as mentioned above, to sort any particular structure against the "watch list." A "Bridge History" function allows the user to access the historical data regarding the bridge as described above. Also, as described above, the user can view the real-time gauge data and compare that data to the expected readings. A 50-year Precipitation event for a particular structure and relevant structure data is listed. From the inventive system the user can report and recommend an action plan. Actions can be prioritized and might include physical inspection of the structure, closure of sections of the structure and/or re-routing of traffic. The user can edit and then submit his report by clicking, as known in the art. The report form presented to the user by the system may have boxes to be checked for channeling the information to the proper authorities. The report will be a record and a means for communication for inspectors, engineers, and management. The report may be accessible from several locations in real-time for timely decisions and actions to be taken.

Figure 11:
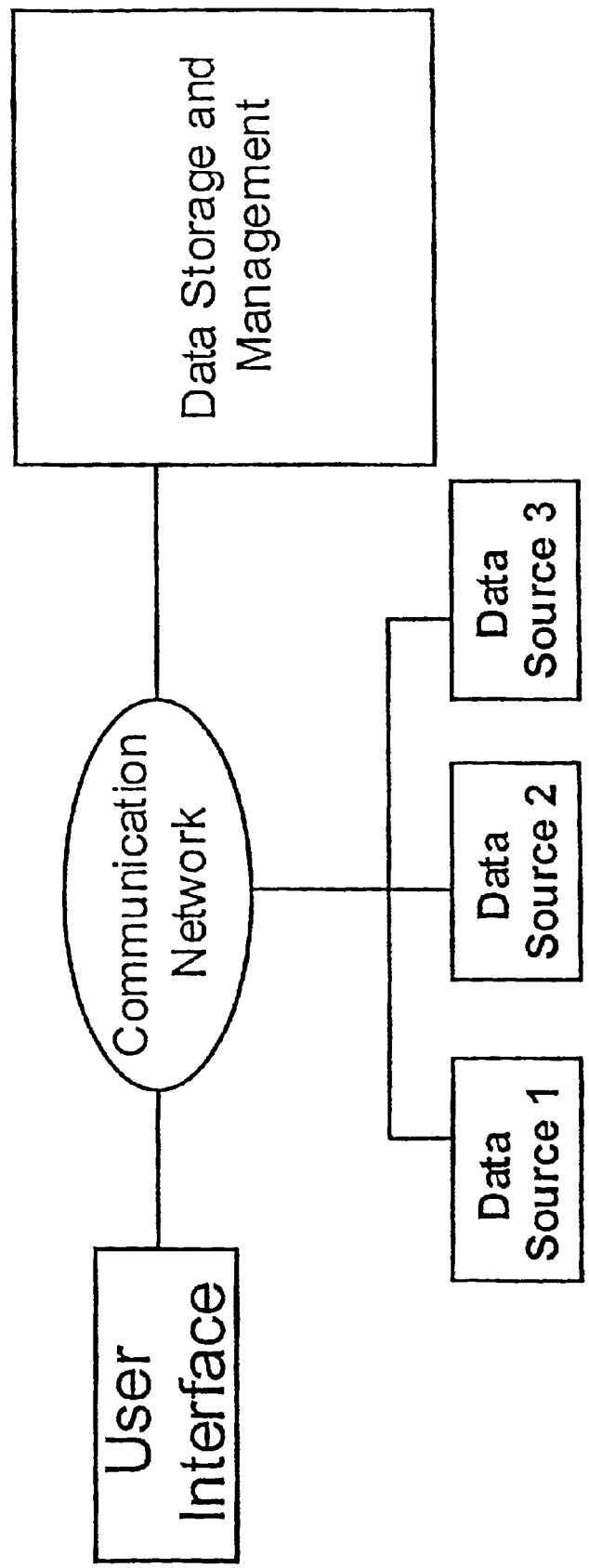
FIG. 11 shows an embodiment of the architecture of a communication and retrieval application for data monitored by the present invention.

FIG. 11 depicts an embodiment of a data communication network of the present invention with multiple data sources communicating in a network to a database and, in real-time, to a user interface. The system can utilize the Internet as its communication network and in object oriented database management system (OODBMS) for rapid customized development and improved system integrity. Preferably the system uses a multitier system architecture for improved flexibility and scalability.

A "Profile" in accordance with the invention can be an assembly of attributes established for each user whereby the system responds specifically to the attributes in the profile. Profiles can define the behavior of the user interface. Each profile can contain what real-time data sources can be interrogated for the profile, the explicit conditions that cause a notification to occur, and the precise form the notification takes. In a simple example, a profile could correspond with a user and the user's requirements for data monitoring. However, more complicated setups are certainly possible, where the user is a large organization, there may be a profile to notify separate departments of particular occurrences, as well as, key individuals within the group.

As a simple illustrative example, if a user wishes to be notified when the National Weather Service (NWS) issues a flood warning for a particular river, watershed or county of a particular state. He may wish to be faxed the text of the message. If the warning is issued during business hours, he may wish to be paged with a short text summary of the warning. He might also wish to be able to access the system and view a log of everything that the monitoring systme has sent to him.

Interrogation. The profile can be configured to interrogate the NWS website listing weather warnings for that state as well as the specifics including county, watershed, river and current time.

Conditions. There are two sets of conditions for this example profile: (a) a warning from the state's NWS warning site must be a flood warning, and it must affect the particular county, watershed, river and (b) a warning from the state's NWS warning site must be a flood warning, it must affect the particular county, watershed, river during business hours.

Form of notification. If condition (a) is satisfied, a fax with the text is sent to a fax number defined in the user's profile. If condition (b) is satisfied, a summary is generated and sent to his text pager/cell phone. If either conditions (a) or (b) is satisfied, a log of defined form is updated in the database. There are certainly many more complicated profiles or combinations of profiles that can be customized to the user's needs.

In particular, as this pertains to monitoring scour, a use could include an interrogation of gauges, where if the gauge reports a value that is greater than a predetermined threshold, or multiple gauges combined are report a set or combination of values greater than an established threshold, a map is generated with the locations of the bridges/dams associated with the offending gauges, as well as a an ordered list of which is likely to be most critical based on the Structure Information Database (SID) data. This map can be both faxed to a particular office and displayed on the user's interface.

The profiles, as well as logs, commonly used sets of conditions or means of generating forms of notification, may all be stored in a database. The system may derive some reliability from the programs used in its implementation (ie. it may get recoverability from a transactional database) but there will likely be a form of self-monitoring going on, where a second monitoring system may be running, and one of its profiles is interrogating the first, and if the first fails, the second will attempt to restart it, while notifying a technical support person that the program malfunctioned and may or may not require review.

It is to be understood that the above-described embodiments are simply illustrative of the principles of the invention. Various and other modifications and changes may be made by those skilled in the art; which will embody the principles of the invention and fall within the spirit and scope thereof.

What is claimed is:

1. A system to present data about at least one artificial structure in or over at least one hydrological feature, the system comprising:
   at least one database for storing data about the at least one artificial structures, wherein the stored data includes structural data and is associated with one or more of the at least one artificial structure, where the at least one artificial structure is associated with at least one threshold;
   at least one data source for providing stored data;
   a user interface for presenting at least one warning signal associated with the at least one artificial structure at least one threshold associated with the at least one artificial structure and the stored data.

2. The system of claim 1, wherein the at least one data source provides at least one of; hydrological data, meteorological data, geological data device data.

3. The system of claim 2, wherein the user interface presents at least one of; hydrological data, meteorological data, structural data, environmental data, geographical data device data.

4. The system of claim 1, wherein the user interface receives and displays real-time data from the at least one data source.

5. The system of claim 1 , wherein the least data source provides environmental data selected from the group consisting of soil, vegetarian, river, hydrological, coastal, tidal and seismic data.

6. The system of claim 1, wherein the at least data source provides meteorological data selected from the group consisting of radar, tide, snow and warning data.

7. The system of claim 1, wherein the at least one data source provides structural data selected from the group consisting of structural detail, attributes, plans, inspection reports, maintenance memos and bridge history data.

8. The system of claim 1, wherein the user interface presents data from at least a first data source and a second data source.

9. The system of claim 7, wherein the user interface presents data by displaying a graphical representation of data from the first data source onto data from the second data source.

10. The system of claim 8, wherein the first data source is associated with a map showing a meteorological conditions, and the second data source is associate with a map showing the location of the structure.

11. The system of claim 1 further comprising a computer instructions for prioritizing the stored data and presenting a the at least one warning signal to a user.

12. The system of claim 11, wherein the at least one warning signal includes at least one of; a telephone call, an e-mail, a page, a fax, an instant message.

13. The system of claim 1, further comprising computer instructions to send the at least one warning signal to at least one of a user and a central site.

14. The system of claim 1 wherein the user interface comprises:
- a general map of an area, showing the at least one artificial structures and the at least one hydrological features,
- a second map showing detail including at least one of; population density, detouring options for traveling public, emergency facilities, existing evacuation routes, and real-time location of safety personnel responding to the event, and
- a comparative chart of a threshold for the area that has caused a the at least one warning signal to be sent and a normal or expected data for the area.

15. The system of claim 14, wherein the user can select at least one of; the general map, the second map, and the detail.

16. The system of claim 1, further comprising a computer instructions for calculating risk probability, where the risk probability is used to prioritize the deployment of emergency personnel in response to the at least warning signal.

17. The system of claim 16, wherein the computer instructions for calculating risk probability use a weighted risk function to create a ranking of risk probability.

18. The system of claim 1, wherein a user profile determines the data to be presented to the user.

19. The system of claim 1, wherein the stored data includes at least one of: hydrological data, meteorological data, structural data, environmental data, geographical data and device data.

20. A system for monitoring an at least one artificial structure in or over a least one hydrological feature, the system comprising:
- a computer in communication with:
  - at least one data source which provides measurement data representative of at least one measurement of an environmental condition affecting the at least one artificial structure, and
  - at least one database which stores a at least one threshold for the measurement data;
- wherein the computer compares the measurement data with the at least one threshold and communicates least one alert when the measurement data exceeds the at least one threshold.

21. The system of claim 20, wherein the at least one data source provides at least one of: meteorological data, hydrological data, geological data, device data.

22. The system of claim 20, wherein the measurement data is at least one of; radar data, tide data, snow data, warning data, water flow data, water stage data, ice data, soil data, vegetation data, seismic data, scour data.

23. The system of claim 20, wherein the at least one alert is least one of: a page, a telephone call, a fax, an email.

24. The system of claim 20, where the at least one alert identifies the at least one threshold, exceeded by the measurement data the measurement data exceeding the at least one threshold, and the location of the least one artificial structure corresponding to the at least one threshold exceeded by the measurement data.

25. A method for monitoring at least one artificial structure in or over at least one hydrological feature, the method comprising:
- receiving, over a communications network, measurement data representing at least one measurement of an environmental condition affecting the at least one artificial structure;
- comparing the received measurement data to at least one threshold
- communicating an alert when the received measurement data exceeds the at least one threshold.

26. The method of claim 25, wherein the received measurement data is at least one of; meteorological data, hydrological data, geological data, device data.

27. The method of claim 25, wherein the received measurement data is a least one of radar data, tide data, snow data, warning data, water flow data, water stage data, ice data, soil data, vegetation data, seismic data, scour data.

28. The method of claim 25, wherein the alert is at least one of; a page, a telephone call a fax, an email.

29. The method of claim 25, where the at least one alert identifies at least one of; the at least one threshold exceeded by the received measurement data, the received measurement data exceeding the at least one threshold, and the location of the at least one artificial structure corresponding to the at least one threshold exceeded by the received measurement data.

30. A system for prioritizing at least one artificial structures in or over hydrological features, the system comprising:
- a computer in communication with:
  - data sources which provide measurement data representing at least one measurement of en environmental condition associated with the at least one-artificial structures;
  - at least one database which associates the measurement data with one or more of the at least one artificial structure, where the at least one artificial structure is associated with at least one threshold, where the at least one threshold is associated with a priority;
- wherein the computer;
  - compares the measurement data the associated at least one thresholds to identify the measurement data exceeding the associated at least one thresholds;
  - identifies at least one artificial structures associated with the identified measurement data; and
  - prioritizes the at least one artificial structures based on the priority associated with the at least one threshold exceeded by the identified measurement data 31. The system of claim 30, wherein the data sources provide at least one of; meteorological data, hydrological data, geological data, device data.

32. The system of claim 30, wherein the data is at least one of; radar data, tide data, snow data, warning data, water flow data, water stage data, ice data, soil data, vegetation data, seismic data, scour data.

33. The system of claim 30, wherein the computer further provides least one alert that identifies at least one of; the exceeded threshold, the measurement that exceeds the threshold, the priority of the exceeded threshold and the location of the structure corresponding to the exceeded threshold.

34. The system of claim 33, where in the least one is a page, a telephone call, a fax, and an email.

35. A method for prioritizing at least one artificial structures in or over at leant one hydrological features, the method comprising:

receiving, over a communications network, measurement data representing at least one measurement of an environmental condition associated with the at least one artificial structures;

storing the measurement data in at least one data base to associate the measurement data with one or more of the at least one artificial structure, where the at least one artificial structure is associated with at least one threshold, where the at least one threshold is associated with a priority;

comparing the measurement data with the associated at least one threshold to identify measurement data exceeding the associated at least one thresholds;

identifying those of the at least one artificial structures associated with the identified measurement data; and prioritizing the identified artificial structures based on the priority associated with the at least one threshold exceeded by the identified measurement data.

36. The method of claim 35, wherein the received measurement data is at least one of; meteorological data, hydrological data, geological data, device data.

37. The method of claim 35, wherein the received measurement data is at least one of; radar data, tide data, snow data, warning data, water flow data, water stage data, ice data, soil data, vegetation data, seismic data, scour data.

38. The method of claim 35, further comprising:

providing least one alert that identifies at least one of; the at least one threshold exceeded by the measurement data, the identified measurement data, the priority of the at least one threshold exceeded by the measurement data, and the location of the at least one artificial structure with the least one threshold exceeded by the measurement data.

39. The method of claim 38, where the at least one alert is at least one of; a page, a telephone call, a fax, an email.

* * * * *

UNITED STATES PATENT AND TRADEMARK OFFICE
CERTIFICATE OF CORRECTION

PATENT NO.  : 6,862,528 B2
DATED       : March 1, 2005
INVENTOR(S) : Joseph P. Scannell It is certified that error appears in the above-identified patent and that said Letters Patent is hereby corrected as shown below:

Title page,
Item [63], Related U.S. Application Data, please change "Continuation of application No. 09/905,724" to -- Continuation-in-part of application No. 09/905,724 --

Signed and Sealed this

Twenty-fourth Day of May, 2005

JON W. DUDAS
*Director of the United States Patent and Trademark Office*